(12) United States Patent
Gao

(10) Patent No.: US 9,484,995 B2
(45) Date of Patent: Nov. 1, 2016

(54) METHOD, SYSTEM, AND DEVICE FOR TRANSMITTING CODING INSTRUCTION INFORMATION AND FOR DETERMINING PRE-CODING MATRIX

(71) Applicant: China Academy of Telecommunications Technology, Beijing (CN)

(72) Inventor: Qiubin Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/434,017

(22) PCT Filed: Aug. 30, 2013

(86) PCT No.: PCT/CN2013/082617
§ 371 (c)(1),
(2) Date: Apr. 7, 2015

(87) PCT Pub. No.: WO2014/059831
PCT Pub. Date: Apr. 24, 2014

(65) Prior Publication Data
US 2015/0263800 A1    Sep. 17, 2015

(30) Foreign Application Priority Data
Oct. 19, 2012 (CN) .......................... 2012 1 0401402

(51) Int. Cl.
*H04B 15/00* (2006.01)
*H04B 7/04* (2006.01)
(Continued)

(52) U.S. Cl.
CPC .......... *H04B 7/0456* (2013.01); *H04B 7/0617* (2013.01); *H04B 7/0639* (2013.01); *H04L 1/00* (2013.01); *H04L 25/0391* (2013.01)

(58) Field of Classification Search
CPC ........ H04B 3/32; H04B 3/23; H04B 1/1027; H04B 1/123; H04B 1/1036; H04L 25/03343; H04L 25/497; H04L 25/03057; H04L 27/368; H04L 27/2647; H04L 1/20; H03F 1/3247; H03F 1/3294; H03F 2201/3233
USPC ................ 375/219–222, 229–232, 259–285, 375/295–352
See application file for complete search history.

(56) References Cited

U.S. PATENT DOCUMENTS

| 8,705,659 | B2 * | 4/2014 | Tong ................... | H04B 7/0417 375/296 |
| 2011/0103493 | A1 * | 5/2011 | Xia ...................... | H04B 7/0632 375/259 |

(Continued)

FOREIGN PATENT DOCUMENTS

| CN | 101095333 | 12/2007 |
| CN | 101553996 | 10/2009 |

(Continued)

OTHER PUBLICATIONS

International Search Report for PCT/CN2013/082617 mailed Dec. 12, 2013.

(Continued)

*Primary Examiner* — James M Perez
(74) *Attorney, Agent, or Firm* — Foley & Lardner LLP; James F. Ewing; Paul M. H. Pua

(57) ABSTRACT

The present application relates to the technical field of radio communications, and relates specifically to a method, system, and device for transmitting coding instruction information and for determining a pre-coding matrix, for use in solving the problem that direct application of current codebooks to a three-dimensional beamforming/pre-coding technology causes performance degradation. The method of embodiments of the present application comprises: a user equipment determines and transmits first pre-coding instruction information, second pre-coding instruction information, and third pre-coding instruction information, where the first pre-coding instruction information, the second pre-coding instruction information, and the third pre-coding instruction information correspond to a pre-coding matrix, a first component pre-coding matrix is a block diagonal matrix, a third component pre-coding matrix is constituted by a weighted column selection vector, and, with the exception of a P-number of nonzero elements, the remainder of the weighted column selection vector is all zeros. Employment of the solution of the embodiments of the present application increases the performance of the three-dimensional beamforming/pre-coding technology.

18 Claims, 4 Drawing Sheets

(51) Int. Cl.
  *H04B 7/06* (2006.01)
  *H04L 1/00* (2006.01)
  *H04L 25/03* (2006.01)

(56) References Cited

U.S. PATENT DOCUMENTS

| | | | |
|---|---|---|---|
| 2011/0150113 A1* | 6/2011 | Oyman | H04L 1/0019 375/260 |
| 2011/0274200 A1* | 11/2011 | Lee | H04L 25/03343 375/295 |
| 2015/0180557 A1* | 6/2015 | Kim | H04B 7/0456 375/267 |
| 2015/0229371 A1* | 8/2015 | Kim | H04B 7/0469 375/267 |
| 2015/0236773 A1* | 8/2015 | Kim | H04B 7/0626 375/295 |

FOREIGN PATENT DOCUMENTS

| | | |
|---|---|---|
| CN | 102412885 | 4/2012 |
| WO | WO-2011/150549 | 12/2011 |
| WO | WO-2012/008710 | 1/2012 |

OTHER PUBLICATIONS

Extended European Search Report for 13848056.1 mailed Oct. 9, 2015.
Alcatel-Lucent Shanghai Bell et al: 'Considerations on CSI feedback enhancements for high-priority antenna configurations', 3GPP Draft; R1-112420 Considerations on CSI Feedback Enhancements for High-Priority Antenna Configurations_Clean, 3rd Generation Partnership Project (3GPP), Mobile Competence Centre; 650, Route Des Lucioles ; F-06921 Sophia-Antipolis Cedex ; France, vol. RAN WG1, no. Athens, Greece; Aug. 22, 2011, Aug. 18, 2011, XP050537814, [retrieved on Aug. 18, 2011] * pp. 1,4,5 *.

* cited by examiner

701

A user equipment determines a first pre-coding indicator, a second pre-coding indicator and a third pre-coding indicator, where the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer

702

The user equipment transmits the first pre-coding indicator, the second pre-coding indicator and the third pre-coding indicator to the network side

A network side device receives a first pre-coding indicator, a second pre-coding indicator and a third pre-coding indicator from a user equipment

802

The network side device determines a pre-coding matrix from the first pre-coding indicator, the second pre-coding indicator and the third pre-coding indicator, where the pre-coding matrix is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer

Fig.8

METHOD, SYSTEM, AND DEVICE FOR TRANSMITTING CODING INSTRUCTION INFORMATION AND FOR DETERMINING PRE-CODING MATRIX

This application is a US National Stage of International Application No. PCT/CN2013/082617, filed on Aug. 30, 2013, designating the United States and claiming the priority of Chinese Patent Application No. 201210401402.3, filed with the Chinese Patent Office on Oct. 19, 2012 and entitled "Method, system, and device for transmitting coding instruction information and for determining pre-coding matrix", the content of which is hereby incorporated by reference in its entirety.

FIELD

The present invention relates to the field of wireless communications and particularly to a method, system, and device for transmitting a coding indicator and determining a pre-coding matrix.

BACKGROUND

Closed-loop pre-coding technology has been introduced in the Long Term Evolution (LTE) Release 8 (Rel-8) system to improve the spectrum efficiency. Closed-loop pre-coding firstly requires the same set of pre-coding matrices, referred to as a codebook, to be stored at both a base station and a user equipment. The user equipment estimates channel information from a common pilot signal of a cell and then selects a pre-coding matrix from the codebook according to some criterion which can be maximizing mutual information, maximizing output signal to interference and noise ratio, etc. The user equipment feeds back an index of the selected pre-coding matrix in the codebook to the base station over an uplink channel, where the index is referred to as a Pre-coding Matrix Indicator (PMI). The base station can determine the pre-coding matrix to be used for the user equipment from the value of the received index. The pre-coding matrix reported by the user equipment can be considered as a quantified channel state information.

In an existing cellular system, an array of antennas of a base station is typically arranged horizontally as illustrated in FIG. 1 and FIG. 2. A beam at a transmitter of the base station can be adjusted only horizontally but with a common vertical down tilt angle for every user equipment, so various beam-forming/pre-coding technologies are generally applied based upon horizontal channel information. In fact, a radio signal propagates in three dimensions in space, and the performance of the system may not be optimized with this common vertical down tilt angle. Adjusting of the beam in vertical domain may be of great significance to the improvement of the performance of the system. Along with the development of antenna technologies, an array of active antennas with each array element being separately controllable has emerged in the industry as illustrated in FIG. 3A and FIG. 3B. Dynamic adjusting of a beam in vertical domain becomes possible with this array of antennas. 3D beam-forming/pre-coding may be performed in a Frequency Division Duplex (FDD) system based upon channel state information reported by a user equipment, possibly using a codebook as conventionally used in the LTE Rel-8 system. However the existing codebook is designed for horizontal beam-forming/pre-coding, so a direct application thereof to 3D beam-forming/pre-coding may degrade the performance.

In summary, the existing codebook is designed for horizontal beam-forming/pre-coding, so a direct application thereof to 3D beam-forming/pre-coding may degrade the performance.

SUMMARY

Embodiments of the invention provide a method, system and device for transmitting a coding indicator and determining a pre-coding matrix so as to address such a problem in the prior art that the existing codebook is designed for horizontal beam-forming/pre-coding, so a direct application thereof to 3D beam-forming/pre-coding may degrade the performance.

An embodiment of the invention provides a method for transmitting a coding indicator, the method including:

determining, by a user equipment, a first pre-coding indicator, a second pre-coding indicator and a third pre-coding indicator, wherein the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer; and transmitting, by the user equipment, the first pre-coding indicator, the second pre-coding indicator and the third pre-coding indicator to the network side.

An embodiment of the invention provides a method for determining a pre-coding matrix, the method including:

receiving, by a network side device, a first pre-coding indicator, a second pre-coding indicator and a third pre-coding indicator from a user equipment; and determining, by the network side device, a pre-coding matrix from the first pre-coding indicator, the second pre-coding indicator and the third pre-coding indicator, wherein the pre-coding matrix is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer.

An embodiment of the invention provides a user equipment for transmitting a coding indicator, the user equipment including:

a first determining module used to determine a first pre-coding indicator, a second pre-coding indicator and a third pre-coding indicator, wherein the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer; and a transmitting module used to transmit the first pre-coding indicator, the second pre-coding indicator and third pre-coding indicator to the network side.

An embodiment of the invention provides a network side device for determining a pre-coding matrix, the network side device including:

a receiving module used to receive a first pre-coding indicator, a second pre-coding indicator and a third pre-coding indicator from a user equipment; and a second determining module used to determine a pre-coding matrix from the first pre-coding indicator, the second pre-coding indicator and the third pre-coding indicator, wherein the pre-coding matrix is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer.

An embodiment of the invention provides a system for determining a pre-coding matrix, the system including:

a user equipment used to determine a first pre-coding indicator, a second pre-coding indicator and a third pre-coding indicator, and to transmit the first pre-coding indicator, the second pre-coding indicator and third pre-coding indicator to the network side, wherein the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer; and the network side device used to receive the first pre-coding indicator, the second pre-coding indicator and the third pre-coding indicator from the user equipment; and to determine the pre-coding matrix from the first pre-coding indicator, the second pre-coding indicator and the third pre-coding indicator.

In the embodiments of the invention, the user equipment determines the first pre-coding indicator, the second pre-coding indicator and the third pre-coding indicator, where the first pre-coding indicator, the second pre-coding indicator and the third pre-coding indicator correspond to a pre-coding matrix which is equal to a matrix as a function of the first component pre-coding matrix, the second component pre-coding matrix and the third component pre-coding matrix, the first component pre-coding matrix is a block diagonal matrix, the third component pre-coding matrix is composed of weighted column selection vectors, and in each of the weighted column selection vectors only P elements are non-zero. The pre-coding matrix can be constructed to better match a space channel with 3D beam-forming to thereby improve the performance of 3D beam-forming/pre-coding.

BRIEF DESCRIPTION OF THE DRAWINGS

FIG. 7 illustrates a schematic flow chart of a method for transmitting a coding indicator according to an embodiment of the invention; and FIG. 8 illustrates a schematic flow chart of a method for determining a pre-coding matrix according to an embodiment of the invention.

DETAILED DESCRIPTION OF THE EMBODIMENTS

In the embodiments of the invention, a user equipment determines a first pre-coding indicator, a second pre-coding indicator and a third pre-coding indicator, where the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, the third component pre-coding matrix is composed of weighted column selection vectors, and in each of the weighted column selection vectors only P elements are non-zero. The pre-coding matrix can be constructed to better match a space channel with 3D beam-forming to thereby improve the performance of 3D beam-forming/pre-coding.

The embodiments of the invention will be described below in further details with reference to the drawings.

In the following description, firstly an implementation with cooperation of the network side and the user equipment side will be described, and then implementations at the network side and the user equipment side will be described respectively, but this will not suggest required cooperation of both the sides for an implementation. In fact, problems encountered respectively at the network side and the user equipment side will also be addressed in the separate implementations at the network side and the user equipment side, although a better technical effect can be achieved in the implementation with cooperation of both the sides.

Figure 1:
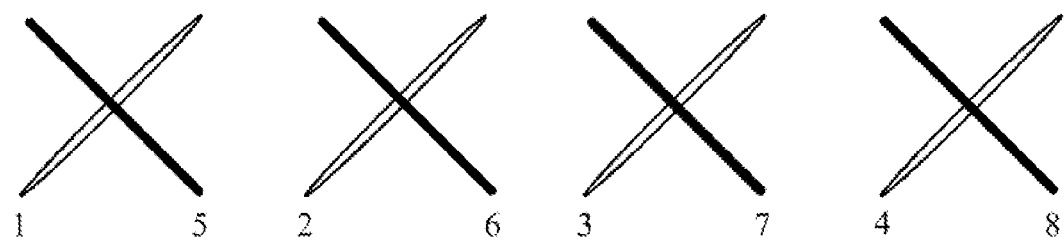
FIG. 1 illustrates a schematic diagram of horizontally arranged dually-polarized antennas in the prior art.
Figure 2:
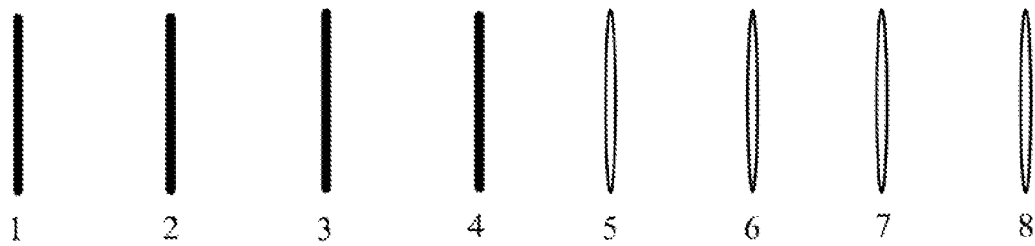
FIG. 2 illustrates a schematic diagram of horizontally arranged linearly-arrayed antennas in the prior art.
Figure 3A:
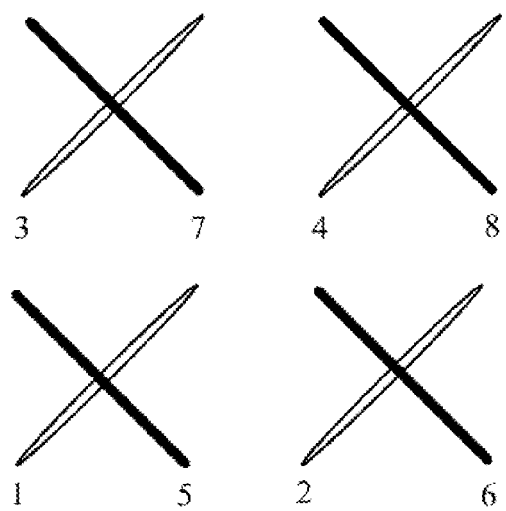
FIG. 3A illustrates a schematic diagram of horizontally 2D-arranged dually-polarized antennas in the prior art.
Figure 3B:
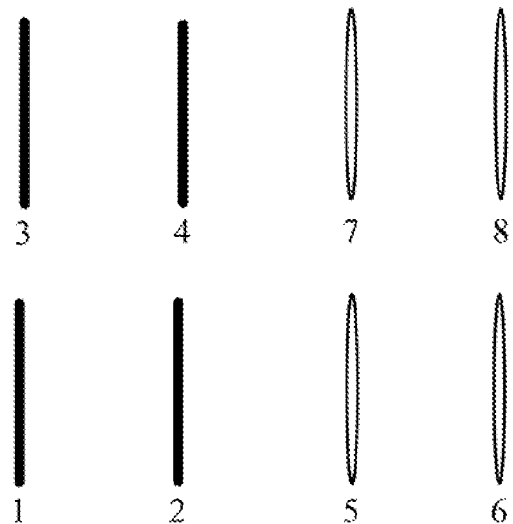
FIG. 3B illustrates a schematic diagram of vertically 2D-arranged linearly-arrayed antennas in the prior art.
Figure 4:
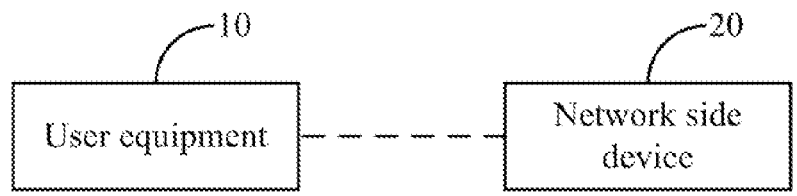
FIG. 4 illustrates a schematic structural diagram of a system for determining a pre-coding matrix according to an embodiment of the invention.

As illustrated in FIG. 4, a system for determining a pre-coding matrix according to an embodiment of the invention includes a user equipment 10 and a network side device 20.

The user equipment 10 is used to determine a first pre-coding indicator, a second pre-coding indicator and a third pre-coding indicator, and to transmit the first pre-coding indicator, the second pre-coding indicator and the third pre-coding indicator to the network side, where the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer; and The network side device 20 is used to receive the first pre-coding indicator, the second pre-coding indicator and the third pre-coding indicator from the user equipment; and to determine the pre-coding matrix from the first pre-coding indicator, the second pre-coding indicator and the third pre-coding indicator.

Preferably P is 2.

In an implementation, the user equipment 10 can determine the first pre-coding indicator, the second pre-coding indicator and the third pre-coding indicator in a number of approaches, several of which will be listed below:

In a first approach, the user equipment 10 selects the first component pre-coding matrix from a set of first component pre-coding matrices and determines the first pre-coding indicator corresponding to the selected first component pre-coding matrix, selects the second component pre-coding matrix from a set of second component pre-coding matrices and determines the second pre-coding indicator corresponding to the selected second component pre-coding matrix, and selects the third component pre-coding matrix from a set of third component pre-coding matrices and determines the third pre-coding indicator corresponding to the selected third component pre-coding matrix.

Particularly the user equipment 10 estimates a channel of each antenna port to the user equipment 10 according to a pilot signal transmitted by the network side device 20, where each antenna port corresponds to one or more physical antennas; and Then the user equipment 10 selects the first component pre-coding matrix from the set of first component pre-coding matrices, selects the second component pre-coding matrix from the set of second component pre-coding matrices, and selects the third component pre-coding matrix from the set of third component pre-coding matrices, according to the estimated channels.

Particularly the user equipment determines the first pre-coding indicator corresponding to the first component pre-coding matrix according to a preset correspondence relationship between the first component pre-coding matrix and the first pre-coding indicator, determines the second pre-coding indicator corresponding to the second component pre-coding matrix according to a preset correspondence relationship between the second component pre-coding matrix and the second pre-coding indicator, and determines the third pre-coding indicator corresponding to the third component pre-coding matrix according to a preset correspondence relationship between the third component pre-coding matrix and the third pre-coding indicator.

Where the correspondence relationships between the component pre-coding matrices and the pre-coding indicators can be preset as needed. In an implementation, the correspondence relationships can be specified in a protocol or can be signaled in high-layer signaling.

Where the first component pre-coding matrix can be determined by maximizing mutual information or maximizing an output signal to interference and noise ratio or maximizing an output energy, where the first component pre-coding matrix can be determined by maximizing an output energy in the equation of:

$$W_1 = \underset{V \in C_1}{\mathrm{argmax}} \|H_1 V\|^2,$$

Where $C_1$ represents a set of possible first component pre-coding matrices, and $H_1$ represents a part of a channel matrix of the network side device 20 to the user equipment 10, particularly a part thereof corresponding to the first component pre-coding matrix, e.g., channels of 1 column of antennas in the vertical direction.

The second component pre-coding matrix can be determined by maximizing mutual information or maximizing an output signal to interference and noise ratio or maximizing an output energy, where the second component pre-coding matrix can be determined by maximizing an output energy in the equation of:

$$W_2 = \underset{V \in C_2}{\mathrm{argmax}} \|H_2 V\|^2,$$

Where $C_2$ represents a set of possible second component pre-coding matrices, and $H_2$ represents a part of the channel matrix of the network side device 20 to the user equipment 10, particularly a part thereof corresponding to the second component pre-coding matrix, e.g., channels of 1 row of antennas in the horizontal direction.

The third component pre-coding matrix can be determined by maximizing mutual information or maximizing an output signal to interference and noise ratio or maximizing an output energy, where the third component pre-coding matrix can be determined by maximizing an output energy in the equation of:

$$W_3 = \underset{V \in C_3}{\mathrm{argmax}} \|H(W_1 \otimes W_2)V\|^2.$$

Where $C_3$ represents a set of possible third component pre-coding matrices, H represents the channel matrix of the network side device 20 to the user equipment 10, $W_1$ represents the determined first component pre-coding matrix, and $W_2$ represents the determined second component pre-coding matrix.

In the first approach, the user equipment 10 can transmit the first pre-coding indicator, the second pre-coding indicator and the third pre-coding indicator to the network side device 20 over the uplink channel by reporting the first pre-coding indicator, the second pre-coding indicator and the third pre-coding indicator at different time instances, with different time domain granularities and frequency domain granularities or at the same time.

In an implementation, the first component pre-coding matrix in the embodiment of the invention is a block diagonal matrix, and the first component pre-coding matrix is expressed in one of Equation 1 and Equation 2 below:

$$W_1 = \begin{bmatrix} Z & 0 \\ 0 & Z \end{bmatrix}; \text{ and} \qquad \text{Equation 1}$$

$$W_1 = \begin{bmatrix} Z & 0 \\ 0 & ZB \end{bmatrix}; \qquad \text{Equation 2}$$

Where $W_1$ represents the first component pre-coding matrix; Z represents a vertical $D_V \times M_V$-dimension beam-forming matrix; and B represents a $M_V \times M_V$-dimension diagonal matrix, the values of which can be a function of Z or fixed values, where $D_V$ and $M_V$ represent positive integers.

In the first approach, the set of first component pre-coding matrices is composed of first component pre-coding matrices expressed in one of Equation 1 and Equation 2 above.

Preferably Z represents an element in a set of vertical beam-forming matrices $\{Z_q: q=0, 1, \ldots, N_V-1\}$ with $Z=Z_n$ and $0 \leq n \leq N_V-1$, where $N_V$ represents a positive integer. The first pre-coding indicator corresponds to an element in the set in a predefined correspondence relationship, for example, if the first pre-coding indicator is PMI1=i1, then $Z=Z_{i1}$, and at this time the first component pre-coding matrix is $$W_1 = \begin{bmatrix} Z_{i_1} & 0 \\ 0 & Z_{i_1} \end{bmatrix} \text{ or } W_1 = \begin{bmatrix} Z_{i_1} & 0 \\ 0 & Z_{i_1} B_{i1} \end{bmatrix},$$

where $B_{i1}$ corresponds to $Z_{i1}$.

Preferably Z represents a Discrete Fourier Transform (DFT) matrix or a part of the DFT matrix, e.g., first $D_V$ rows and consecutive $M_V$ columns in an L-point DFT matrix, i.e., $$[Z_n]_{it} = e^{j\frac{2\pi i((t+s_n) \bmod L)}{L}} \text{ or } [Z_n]_{it} = e^{-j\frac{2\pi i((t+s_n) \bmod L)}{L}}$$

with $i=0, 1, \ldots, D_V-1$; $t=0, 1, \ldots M_V-1$, where $s_n$ represents the column number of the zero-th column of $Z_n$ in the DFT matrix. Particularly L=4, 8, 16, 32, 64, etc., and $s_n$=n or $s_n$=2n or $s_n$=4n, etc. If B is a function of Z, i.e., $B_n$ depend on $Z_n$, then $$[B_n]_{ii} = e^{j\frac{2\pi((i+s_n) \bmod L)D_V}{L}} \text{ or } [B_n]_{ii} = e^{-j\frac{2\pi((i+s_n) \bmod L)D_V}{L}}.$$

In an implementation, the second component pre-coding matrix in the embodiment of the invention is X or XA;

Where X represents a horizontal $D_H \times M_H$-dimension beam-forming matrix; and A represents a $M_H \times M_H$-dimension diagonal matrix, the values of which can be a function of X or fixed values, where $M_H$ and $D_H$ represent positive integers. Preferably $D_H$ is a half of the number of antennas in horizontal direction.

Preferably X represents an element in a set of horizontal beam-forming matrices $\{X_p: p=0, 1, \ldots, N_H-1\}$ with $X=X_k$ and $0 \leq k \leq N_H-1$, where $N_H$ represents a positive integer. The second pre-coding indicator corresponds to an element in the set in a predefined correspondence relationship, for example, if the second pre-coding indicator is PMI2=i2, then $X=X_{i2}$, and at this time the second component pre-coding matrix is $W_2=X_{i_2}$ or $W_2=X_{i_2} A_{i2}$, where $A_{i2}$ corresponds to $X_{i2}$.

Preferably X represents a DFT matrix or a part of the DFT matrix, e.g., first $D_H$ rows and consecutive $M_H$ columns in an L-point DFT matrix, i.e., $$[X_k]_{it} = e^{j\frac{2\pi i((t+s_k) \bmod L)}{L}} \text{ or } [X_k]_{it} = e^{-j\frac{2\pi i((t+s_k) \bmod L)}{L}}$$

with $i=0, 1, \ldots, D_H-1$; $t=0, 1, \ldots M_H-1$, where $s_k$ represents the column number of the zero-th column of $X_k$ in the DFT matrix. Particularly L=4, 8, 16, 32, 64, etc., and $s_k$=k or $s_k$=2k or $s_k$=4k etc. If A is a function of X, and $A_k$ corresponds to $X_k$, then $$[A_k]_{ii} = e^{j\frac{2\pi((i+s_k) \bmod L)D_H}{L}} \text{ or } [A_k]_{ii} = e^{-j\frac{2\pi((i+s_k) \bmod L)D_H}{L}}.$$

In an implementation, the third component pre-coding matrix is the product of a $(2M_H M_V) \times r$-dimension matrix with a power normalization coefficient, where r represents the number of columns in the pre-coding matrix; and The third component pre-coding matrix is:

$$W_3 = \begin{bmatrix} e_{k_1} & e_{k_2} & \ldots & e_{k_r} \\ \alpha_1 e_{k_1} & \alpha_2 e_{k_2} & \ldots & \alpha_r e_{k_r} \end{bmatrix} M,$$

Where $W_3$ represents the third component pre-coding matrix; $e_{k_i}$ represents a column vector with a length of $M_H M_V$ with the $k_i$-th element being 1 and all the other elements being 0; and $\alpha_i$ represents a complex scalar with a modulus being 1, where $M_H$ and $M_V$ represent positive integers, and M represent the power normalization coefficient.

Preferably $$\alpha_i \in \left\{ e^{j\frac{2\pi t}{4}} : t = 0, 1, \ldots, 3 \right\},$$

where j represents an imagery number, e.g., $$j = e^{j\frac{\pi}{2}}.$$

Where r represents the number of columns in the pre-coding matrix and is also referred to as a rank.

Particularly the third component pre-coding matrix $W_3$ is selected from a set (a codebook), and the third pre-coding indicator corresponds to an element in the set. For example, for a codebook with r=1, there is a set of $W_3$, $$\left\{ \begin{bmatrix} e_i \\ \alpha e_i \end{bmatrix} : i = 0, 1, \ldots, M_H M_V - 1; \alpha = 1, -1, e^{-j\frac{\pi}{2}}, e^{j\frac{\pi}{2}} \right\},$$

where $e_i$ represents a column vector with a length of $M_H M_V$ with the i-th element being 1 and all the other elements being 0. For example, for a codebook with r=2, there is a set of $W_3$, $$\left\{ \begin{bmatrix} e_i & e_i \\ e_i & \alpha e_i \end{bmatrix} : i=0,1,\ldots,M_H M_V - 1; \alpha = -1 \right\},$$

or the set can be a subset of a larger set $$\left\{ \begin{bmatrix} e_i & e_k \\ \alpha_1 e_i & \alpha_2 e_k \end{bmatrix} : i=0,1,\ldots,M_H M_V - 1; k=0,1,\ldots, \right.$$

$$\left. M_H M_V - 1; \alpha_1 = 1, -1, e^{j\frac{\pi}{2}}, e^{-j\frac{\pi}{2}}; \alpha_2 = 1, -1, e^{j\frac{\pi}{2}}, e^{-j\frac{\pi}{2}} \right\}.$$

Generally a codebook with the rank of r can be a subset of a set $$\left\{ \begin{bmatrix} e_{k_1} & e_{k_2} & \cdots & e_{k_r} \\ \alpha_1 e_{k_1} & \alpha_2 e_{k_2} & \cdots & \alpha_r e_{k_r} \end{bmatrix} : k_i = 0, 1, \ldots, \right.$$

$$\left. M_H M_V - 1; \alpha_i = e^{j\frac{2\pi t}{T}}, t=0,1,\ldots,T-1; i=1,\ldots,r \right\},$$

and preferably T=4.

In an implementation, the pre-coding matrix is expressed in one of Equation 3 to Equation 6 below:

$$W = (W_1 \otimes W_2) \cdot W_3 = \left( \begin{bmatrix} Z & 0 \\ 0 & Z \end{bmatrix} \otimes X \right) \begin{bmatrix} Y_1 & \cdots & Y_r \\ \alpha_1 Y_1 & \cdots & \alpha_r Y_r \end{bmatrix} M; \quad \text{Equation 3}$$

$$W = (W_1 \otimes W_2) \cdot W_3 = \left( \begin{bmatrix} Z & 0 \\ 0 & Z \end{bmatrix} \otimes (XA) \right) \begin{bmatrix} Y_1 & \cdots & Y_r \\ \alpha_1 Y_1 & \cdots & \alpha_r Y_r \end{bmatrix} M; \quad \text{Equation 4}$$

$$W = (W_1 \otimes W_2) \cdot W_3 = \left( \begin{bmatrix} Z & 0 \\ 0 & ZB \end{bmatrix} \otimes X \right) \begin{bmatrix} Y_1 & \cdots & Y_r \\ \alpha_1 Y_1 & \cdots & \alpha_r Y_r \end{bmatrix} M; \quad \text{Equation 5}$$

and $$W = (W_1 \otimes W_2) \cdot W_3 = \left( \begin{bmatrix} Z & 0 \\ 0 & ZB \end{bmatrix} \otimes (XA) \right) \begin{bmatrix} Y_1 & \cdots & Y_r \\ \alpha_1 Y_1 & \cdots & \alpha_r Y_r \end{bmatrix} M; \quad \text{Equation 6}$$

Where W represents the pre-coding matrix; $W_1$ represents the first component pre-coding matrix; $W_2$ represents the second component pre-coding matrix; $W_3$ represents the third component pre-coding matrix; X represents a horizontal $D_H \times M_H$-dimension beam-forming matrix which is an element in a set of horizontal beam-forming matrices $\{X_p: p=0, 1, \ldots, N_H-1\}$ with $X=X_k$, where $N_H$ represents a positive integer; Z represents a vertical $D_V \lambda M_V$-dimension beam-forming matrix which is an element in a set of vertical beam-forming matrices $\{Z_q: q=0, 1, \ldots, N_V-1\}$ with $Z=Z_n$; A represents a $M_H \times M_H$-dimension diagonal matrix; and B represents a $M_V \times M_V$-dimension diagonal matrix, where $M_H$, $D_H$, $D_V$ and $M_V$ represent positive integers; $Y_i$ represents a column vector with a length of $M_H M_V$ with only one element being 1 and all the other elements being 0; $\alpha_i$ represents a complex scalar with a modulus being 1; r represents the number of columns in the pre-coding matrix; and M represents a power normalization coefficient.

Preferably $$M = \frac{1}{\sqrt{r D_H D_V}}.$$

In an implementation, Equation 3 to Equation 6 can be further transformed so that the third component pre-coding matrix in Equation 3 to Equation 6 above is the product of the matrix with M; or M can be a part of the first component pre-coding matrix, that is, the first component pre-coding matrix is the product of the matrix with M, and the second component pre-coding matrix and the third component pre-coding matrix are the matrices themselves; or M can be a part of the second component pre-coding matrix, that is, the second component pre-coding matrix is the product of the matrix with M, and the first component pre-coding matrix and the third component pre-coding matrix are the matrices themselves; or M can be separate, i.e., $W=(W_1 \otimes W_2) \cdot W_3 \cdot M$.

The user equipment 10 determines the product of the first component pre-coding matrix, the second component pre-coding matrix and the third second component pre-coding matrix as the pre-coding matrix, i.e., $W=(W_1 \otimes W_2) \cdot W_3$.

In the first approach, if the user equipment 10 predetermines the pre-coding matrix and selects a plurality of first component pre-coding matrices from one of the sets of component pre-coding matrices and selects one component pre-coding matrix from each of the other two sets of component pre-coding matrices respectively, then the user equipment 10 can select one of the plurality of first component pre-coding matrices according to one of Equation 3 to Equation 6.

In a second approach, the user equipment 10 determines at least one pre-coding matrix; determines first pre-coding indicators, second pre-coding indicators and third pre-coding indicators corresponding to the at least one pre-coding matrix according to a correspondence relationship between the first pre-coding indicators, the second pre-coding indicators and the third pre-coding indicators, and the pre-coding matrix; and determines one of the determined first pre-coding indicators, one of the determined second pre-coding indicators and one of the determined third pre-coding indicators as the first pre-coding indicator, the second pre-coding indicator and the third pre-coding indicator to be signaled to the network side.

The user equipment 10 determines the at least one pre-coding matrix as a matrix which is a function of a first component pre-coding matrix, a second component pre-coding matrix and a third component pre-coding matrix. Particularly the user equipment 10 determines the at least one pre-coding matrix as the product of the first component pre-coding matrix, the second component pre-coding matrix and the third component pre-coding matrix.

Where the equations in which the first component pre-coding matrix, the second component pre-coding matrix and the third component pre-coding matrix are expressed in the first approach above can also be applicable to the second approach, and the correspondence relationship between the first component pre-coding matrix, the second component pre-coding matrix and the third second component pre-coding matrix, and the pre-coding matrix in the first approach above can also be applicable to the second approach.

Where the network side device 20 can determine the pre-coding matrix from the first pre-coding indicator, the second pre-coding indicator and the third pre-coding indicator upon reception of the first pre-coding indicator, the second pre-coding indicator and the third pre-coding indicator from the user equipment in a number of approaches, several of which will be listed below:

In a first approach, the network side device 20 determines the first component pre-coding matrix corresponding to the first pre-coding indicator, determines the second component pre-coding matrix corresponding to the second pre-coding indicator and determines the third component pre-coding matrix corresponding to the third pre-coding indicator; and The network side device 20 determines the pre-coding matrix in one of Equation 3 to Equation 6.

Particularly the network side device 20 determines the first component pre-coding matrix corresponding to the first pre-coding indicator, determines the second component pre-coding matrix corresponding to the second pre-coding indicator and determines the third component pre-coding matrix corresponding to the third pre-coding indicator and then substitutes the first component pre-coding matrix, the second component pre-coding matrix and the third component pre-coding matrix into one of Equation 3 to Equation 6, so that the pre-coding matrix corresponding to the first pre-coding indicator, the second pre-coding indicator and the third pre-coding indicator can be determined.

Where the network side device 20 determines the first component pre-coding matrix corresponding to the received first pre-coding indicator according to a preset correspondence relationship between the first component pre-coding matrix and the first pre-coding indicator; determines the second component pre-coding matrix corresponding to the received second pre-coding indicator according to a preset correspondence relationship between the second component pre-coding matrix and the second pre-coding indicator; and determines the third component pre-coding matrix corresponding to the received third pre-coding indicator according to a preset correspondence relationship between the third component pre-coding matrix and the third pre-coding indicator.

The correspondence relationships between the component pre-coding matrices and the pre-coding indicators can be preset as needed. In an implementation, the correspondence relationships can be specified in a protocol or can be signaled in high-layer signaling.

In a second approach, the network side device 20 determines the pre-coding matrix corresponding to the received first pre-coding indicator, second pre-coding indicator and third pre-coding indicator according to a preset correspondence relationship between the first pre-coding indicator, the second pre-coding indicator and the third pre-coding indicator, and the pre-coding matrix.

Where the correspondence relationship between the first pre-coding indicator, the second pre-coding indicator and the third pre-coding indicator, and the pre-coding matrix can be preset as needed. In an implementation, the correspondence relationship can be specified in a protocol or can be signaled in high-layer signaling.

The network side device 20 preprocesses data transmitted by the user equipment using the determined pre-coding matrix after determining the pre-coding matrix.

Where horizontal and vertical dimensions can be interchangeable in the embodiment of the invention.

The network side device 20 in the embodiment of the invention can be a base station (e.g., a macro base station, a home base station, etc.) or a Relay Node (RN) device or other network side devices.

Figure 5A:
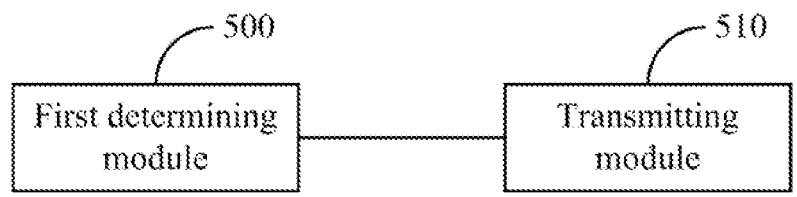
FIG. 5A illustrates a schematic functionally structural diagram of a user equipment in a system for determining a pre-coding matrix according to an embodiment of the invention.

As illustrated in FIG. 5A, a user equipment in a system for determining a pre-coding matrix according to an embodiment of the invention includes a first determining module 500 and a transmitting module 510, where:

The first determining module 500 is used to determine a first pre-coding indicator, a second pre-coding indicator and a third pre-coding indicator, where the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer; and The transmitting module 510 is used to transmit the first pre-coding indicator, the second pre-coding indicator and the third pre-coding indicator to the network side.

Preferably the first determining module 500 selects the first component pre-coding matrix from a set of first component pre-coding matrices and determines the first pre-coding indicator corresponding to the selected first component pre-coding matrix, selects the second component pre-coding matrix from a set of second component pre-coding matrices and determines the second pre-coding indicator corresponding to the selected second component pre-coding matrix, and selects the third component pre-coding matrix from a set of third component pre-coding matrices and determines the third pre-coding indicator corresponding to the selected third component pre-coding matrix.

Preferably the first determining module 500 determines the first pre-coding indicator corresponding to the first component pre-coding matrix according to a preset correspondence relationship between the first component pre-coding matrix and the first pre-coding indicator, determines the second pre-coding indicator corresponding to the second component pre-coding matrix according to a preset correspondence relationship between the second component pre-coding matrix and the second pre-coding indicator, and determines the third pre-coding indicator corresponding to the third component pre-coding matrix according to a preset correspondence relationship between the third component pre-coding matrix and the third pre-coding indicator.

Preferably the first determining module 500 determines at least one pre-coding matrix; determines first pre-coding indicators, second pre-coding indicators and third pre-coding indicators corresponding to the at least one pre-coding matrix according to a correspondence relationship between the first pre-coding indicators, the second pre-coding indicators and the third pre-coding indicators, and the pre-coding matrix; and determines one of the determined first pre-coding indicators, one of the determined second pre-coding indicators and one of the determined third pre-coding indicators as the first pre-coding indicator, the second pre-coding indicator and the third pre-coding indicator to be signaled to the network side.

Figure 5B:
FIG. 5B illustrates a schematic physically structural diagram of a user equipment in a system for determining a pre-coding matrix according to an embodiment of the invention.

Particularly in hardware, the first determining module 500 can be a processor, and the transmitting module 510 can be a signal transceiver including transmitter and receiver antennas, etc., and at this time, as illustrated in FIG. 5B, a user equipment in a system for determining a pre-coding matrix according to an embodiment of the invention includes:

A first processor 5000 is used to determine a first pre-coding indicator, a second pre-coding indicator and a third pre-coding indicator, where the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer; and A first signal transceiver 5100 is used to transmit the first pre-coding indicator, the second pre-coding indicator and the third pre-coding indicator to the network side.

Preferably the first processor 5000 selects the first component pre-coding matrix from a set of first component pre-coding matrices and determines the first pre-coding indicator corresponding to the selected first component pre-coding matrix, selects the second component pre-coding matrix from a set of second component pre-coding matrices and determines the second pre-coding indicator corresponding to the selected second component pre-coding matrix, and selects the third component pre-coding matrix from a set of third component pre-coding matrices and determines the third pre-coding indicator corresponding to the selected third component pre-coding matrix.

Preferably the first processor 5000 determines the first pre-coding indicator corresponding to the first component pre-coding matrix according to a preset correspondence relationship between the first component pre-coding matrix and the first pre-coding indicator, determines the second pre-coding indicator corresponding to the second component pre-coding matrix according to a preset correspondence relationship between the second component pre-coding matrix and the second pre-coding indicator, and determines the third pre-coding indicator corresponding to the third component pre-coding matrix according to a preset correspondence relationship between the third component pre-coding matrix and the third pre-coding indicator.

Preferably the first processor 5000 determines at least one pre-coding matrix; determines first pre-coding indicators, second pre-coding indicators and third pre-coding indicators corresponding to the at least one pre-coding matrix according to a correspondence relationship between the first pre-coding indicators, the second pre-coding indicators and the third pre-coding indicators, and the pre-coding matrix; and determines one of the determined first pre-coding indicators, one of the determined second pre-coding indicators and one of the determined third pre-coding indicators as the first pre-coding indicator, the second pre-coding indicator and the third pre-coding indicator to be signaled to the network side.

Figure 6A:
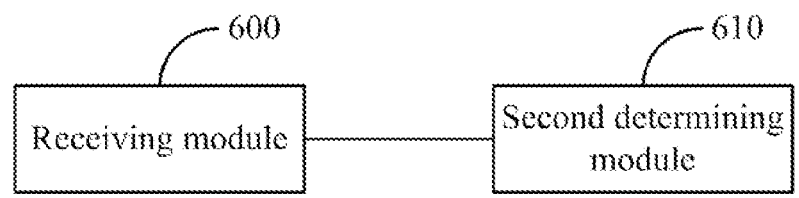
FIG. 6A illustrates a schematic functionally structural diagram of a network side device in a system for determining a pre-coding matrix according to an embodiment of the invention.

As illustrated in FIG. 6A, a network side device in a system for determining a pre-coding matrix according to an embodiment of the invention includes a receiving module 600 and a second determining module 610, where:

The receiving module 600 is used to receive a first pre-coding indicator, a second pre-coding indicator and a third pre-coding indicator from a user equipment; and The second determining module 610 is used to determine a pre-coding matrix from the first pre-coding indicator, the second pre-coding indicator and the third pre-coding indicator, Where the pre-coding matrix is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer.

Preferably the second determining module 610 determines the first component pre-coding matrix corresponding to the first pre-coding indicator, determines the second component pre-coding matrix corresponding to the second pre-coding indicator, and determines the third component pre-coding matrix corresponding to the third pre-coding indicator; and determines the pre-coding matrix in one of Equation 3 to Equation 6.

Preferably the second determining module 610 determines the first pre-coding indicator corresponding to the received first component pre-coding matrix according to a preset correspondence relationship between the first component pre-coding matrix and the first pre-coding indicator, determines the second pre-coding indicator corresponding to the received second component pre-coding matrix according to a preset correspondence relationship between the second component pre-coding matrix and the second pre-coding indicator, and determines the third pre-coding indicator corresponding to the received third component pre-coding matrix according to a preset correspondence relationship between the third component pre-coding matrix and the third pre-coding indicator.

Preferably the second determining module 610 determines the pre-coding matrix corresponding to the received first pre-coding indicator, second pre-coding indicator and third pre-coding indicator according to a preset correspondence relationship between the first pre-coding indicator, the second pre-coding indicator and the third pre-coding indicator, and the pre-coding matrix.

Figure 6B:
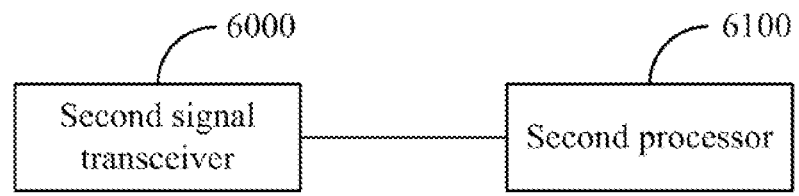
FIG. 6B illustrates a schematic physically structural diagram of a network side device in a system for determining a pre-coding matrix according to an embodiment of the invention.

Particularly in hardware, the receiving module 600 can be a signal transceiver including transmitter and receiver antennas, etc., and the second determining module 610 can be a processor, and at this time, as illustrated in FIG. 6B, a network side device in a system for determining a pre-coding matrix according to an embodiment of the invention includes:

A second signal transceiver 6000 is used to receive a first pre-coding indicator, a second pre-coding indicator and a third pre-coding indicator from a user equipment; and A second processor 6100 is used to determine a pre-coding matrix from the first pre-coding indicator, the second pre-coding indicator and the third pre-coding indicator, Where the pre-coding matrix is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer.

Preferably the second processor 6100 determines the first component pre-coding matrix corresponding to the first pre-coding indicator, determines the second component pre-coding matrix corresponding to the second pre-coding indicator, and determines the third component pre-coding matrix corresponding to the third pre-coding indicator; and determines the pre-coding matrix in one of Equation 3 to Equation 6.

Preferably the second processor 6100 determines the first pre-coding indicator corresponding to the received first component pre-coding matrix according to a preset correspondence relationship between the first component pre-coding matrix and the first pre-coding indicator, determines the second pre-coding indicator corresponding to the received second component pre-coding matrix according to a preset correspondence relationship between the second component pre-coding matrix and the second pre-coding indicator, and determines the third pre-coding indicator corresponding to the received third component pre-coding matrix according to a preset correspondence relationship between the third component pre-coding matrix and the third pre-coding indicator.

Preferably the second processor 6100 determines the pre-coding matrix corresponding to the received first pre-coding indicator, second pre-coding indicator and third pre-coding indicator according to a preset correspondence relationship between the first pre-coding indicator, the second pre-coding indicator and the third pre-coding indicator, and the pre-coding matrix.

Based upon the same inventive idea, an embodiment of the invention further provides a method for transmitting a coding indicator, and since the user equipment in the system for determining a pre-coding matrix is a device corresponding to this method, and this method addresses the problem under a similar principle to the user equipment in the system for determining a pre-coding matrix, reference can be made to the implementation of the user equipment for an implementation of this method, and a repeated description thereof will be omitted here.

As illustrated in FIG. 7, a method for transmitting a coding indicator according to an embodiment of the invention includes the following operations:

In the operation 701, a user equipment determines a first pre-coding indicator, a second pre-coding indicator and a third pre-coding indicator, where the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer; and In the operation 702, the user equipment transmits the first pre-coding indicator, the second pre-coding indicator and the third pre-coding indicator to the network side.

Preferably P is 2.

In an implementation, the user equipment can determine the first pre-coding indicator, the second pre-coding indicator and the third pre-coding indicator in a number of approaches, several of which will be listed below:

In a first approach, the user equipment selects the first component pre-coding matrix from a set of first component pre-coding matrices and determines the first pre-coding indicator corresponding to the selected first component pre-coding matrix, selects the second component pre-coding matrix from a set of second component pre-coding matrices and determines the second pre-coding indicator corresponding to the selected second component pre-coding matrix, and selects the third component pre-coding matrix from a set of third component pre-coding matrices and determines the third pre-coding indicator corresponding to the selected third component pre-coding matrix.

Particularly the user equipment estimates a channel of each antenna port to the user equipment according to a pilot signal transmitted by the network side device, where each antenna port corresponds to one or more physical antennas; and Then the user equipment selects the first component pre-coding matrix from the set of first component pre-coding matrices, selects the second component pre-coding matrix from the set of second component pre-coding matrices, and selects the third component pre-coding matrix from the set of third component pre-coding matrices, according to the estimated channels.

Particularly the user equipment determines the first pre-coding indicator corresponding to the first component pre-coding matrix according to a preset correspondence relationship between the first component pre-coding matrix and the first pre-coding indicator, determines the second pre-coding indicator corresponding to the second component pre-coding matrix according to a preset correspondence relationship between the second component pre-coding matrix and the second pre-coding indicator, and determines the third pre-coding indicator corresponding to the third component pre-coding matrix according to a preset correspondence relationship between the third component pre-coding matrix and the third pre-coding indicator.

Where the correspondence relationships between the component pre-coding matrices and the pre-coding indicators can be preset as needed. In an implementation, the correspondence relationships can be specified in a protocol or can be signaled in high-layer signaling.

In the first approach, the user equipment can transmit the first pre-coding indicator, the second pre-coding indicator and the third pre-coding indicator to the network side device over the uplink channel by reporting the first pre-coding indicator, the second pre-coding indicator and the third pre-coding indicator at different time instances, with different time domain granularities and frequency domain granularities or at the same time.

In an implementation, the first component pre-coding matrix in the embodiment of the invention is a block diagonal matrix, and the first component pre-coding matrix is expressed in one of Equation 1 and Equation 2.

In the first approach, the set of first component pre-coding matrices is composed of first component pre-coding matrices expressed in one of Equation 1 and Equation 2.

Preferably Z represents an element in a set of vertical beam-forming matrices $\{Z_q: q=0, 1, \ldots, N_V-1\}$ with $Z=Z_n$ and $0 \leq n \leq N_V-1$, where $N_V$ represents a positive integer.

Preferably Z represents a DFT matrix or a part of the DFT matrix.

In an implementation, the second component pre-coding matrix in the embodiment of the invention is X or XA;

Where X represents a horizontal $D_H \times M_H$-dimension beam-forming matrix; and A represents a $M_H \times M_H$-dimension diagonal matrix, the values of which can be a function of X or fixed values, where $M_H$ and $D_H$ represent positive integers. Preferably $D_H$ is a half of the number of horizontal antennas.

Preferably X represents an element in a set of horizontal beam-forming matrices $\{X_p: p=0, 1, \ldots, N_H-1\}$ with $X=X_k$ and $0 \leq k \leq N_H-1$, where $N_H$ represents a positive integer.

Preferably X represents a DFT matrix or a part of the DFT matrix.

In an implementation, the third component pre-coding matrix is the product of a $(2M_H M_V) \times r$-dimension matrix with a power normalization coefficient, where r represents the number of columns in the pre-coding matrix; and The third component pre-coding matrix is:

$$W_3 = \begin{bmatrix} e_{k_1} & e_{k_2} & \ldots & e_{k_r} \\ \alpha_1 e_{k_1} & \alpha_2 e_{k_2} & \ldots & \alpha_r e_{k_r} \end{bmatrix} M,$$

Where $W_3$ represents the third component pre-coding matrix; $e_{k_j}$ represents a column vector with a length of $M_H M_V$ with the $k_j$-th element being 1 and all the other elements being 0; and $\alpha_i$ represents a complex scalar with a modulus being 1, where $M_H$ and $M_V$ represent positive integers, and M represent the power normalization coefficient.

Preferably $$\alpha_i \in \left\{ e^{j\frac{2\pi t}{4}} : t = 0, 1, \ldots, 3 \right\},$$

where j represents an imagery number, e.g., $$j = e^{j\frac{\pi}{2}}.$$

Where r represents, the number of columns in the pre-coding matrix and is also referred to as a rank.

In the first approach, if the user equipment predetermines the pre-coding matrix and selects a plurality of first component pre-coding matrices from one of the sets of component pre-coding matrices and selects one component pre-coding matrix from each of the other two sets of component pre-coding matrices respectively, then the user equipment can select one of the plurality of first component pre-coding matrices according to one of Equation 3 to Equation 6.

In an implementation, Equation 3 to Equation 6 can be further transformed so that the third component pre-coding matrix in Equation 3 to Equation 6 above is the product of the matrix with M; or M can be a part of the first component pre-coding matrix, that is, the first component pre-coding matrix is the product of the matrix with M, and the second component pre-coding matrix and the third component pre-coding matrix are the matrices themselves; or M can be a part of the second component pre-coding matrix, that is, the second component pre-coding matrix is the product of the matrix with M, and the first component pre-coding matrix and the third component pre-coding matrix are the matrices themselves; or M can be separate, i.e., $W=(W_1 \otimes W_2) \cdot W_3 \cdot M$.

In a second approach, the user equipment determines at least one pre-coding matrix; determines first pre-coding indicators, second pre-coding indicators and third pre-coding indicators corresponding to the at least one pre-coding matrix according to a correspondence relationship between the first pre-coding indicators, the second pre-coding indicators and the third pre-coding indicators, and the pre-coding matrix; and determines one of the determined first pre-coding indicators, one of the determined second pre-coding indicators and one of the determined third pre-coding indicators as the first pre-coding indicator, the second pre-coding indicator and the third pre-coding indicator to be signaled to the network side.

The user equipment determines the at least one pre-coding matrix as a matrix which is a function of a first component pre-coding matrix, a second component pre-coding matrix and a third component pre-coding matrix. Particularly the user equipment determines the at least one pre-coding matrix as the product of the first component pre-coding matrix, the second component pre-coding matrix and the third component pre-coding matrix.

Where the equations in which the first component pre-coding matrix, the second component pre-coding matrix and the third component pre-coding matrix are expressed in the first approach above can also be applicable to the second approach, and the correspondence relationship between the first component pre-coding matrix, the second component pre-coding matrix and the third second component pre-coding matrix, and the pre-coding matrix in the first approach above can also be applicable to the second approach.

Based upon the same inventive idea, an embodiment of the invention further provides a method for determining a pre-coding matrix, and since the network side device in the system for determining a pre-coding matrix is a device corresponding to this method, and this method addresses the problem under a similar principle to the network side device in the system for determining a pre-coding matrix, reference can be made to the implementation of the network side device for an implementation of this method, and a repeated description thereof will be omitted here.

As illustrated in FIG. 8, a method for determining a pre-coding matrix according to an embodiment of the invention includes the following operations:

In the operation 801, a network side device receives a first pre-coding indicator, a second pre-coding indicator and a third pre-coding indicator from a user equipment; and In the operation 802, the network side device determines a pre-coding matrix from the first pre-coding indicator, the second pre-coding indicator and the third pre-coding indicator, Where the pre-coding matrix is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer.

Where the network side device can determine the pre-coding matrix from the first pre-coding indicator, the second pre-coding indicator and the third pre-coding indicator upon reception of the first pre-coding indicator, the second pre-coding indicator and the third pre-coding indicator from the user equipment in a number of approaches, several of which will be listed below:

In a first approach, the network side device determines the first component pre-coding matrix corresponding to the first pre-coding indicator, determines the second component pre-coding matrix corresponding to the second pre-coding indicator and determines the third component pre-coding matrix corresponding to the third pre-coding indicator; and The network side device determines the pre-coding matrix in one of Equation 3 to Equation 6.

Particularly the network side device determines the first component pre-coding matrix corresponding to the first pre-coding indicator, determines the second component pre-coding matrix corresponding to the second pre-coding indicator and determines the third component pre-coding matrix corresponding to the third pre-coding indicator and then substitutes the first component pre-coding matrix, the second component pre-coding matrix and the third component pre-coding matrix into one of Equation 3 to Equation 6, so that the pre-coding matrix corresponding to the first pre-coding indicator, the second pre-coding indicator and the third pre-coding indicator can be determined.

Where the network side device determines the first component pre-coding matrix corresponding to the received first pre-coding indicator according to a preset correspondence relationship between the first component pre-coding matrix and the first pre-coding indicator; determines the second component pre-coding matrix corresponding to the received second pre-coding indicator according to a preset correspondence relationship between the second component pre-coding matrix and the second pre-coding indicator; and determines the third component pre-coding matrix corresponding to the received third pre-coding indicator according to a preset correspondence relationship between the third component pre-coding matrix and the third pre-coding indicator.

The correspondence relationships between the component pre-coding matrices and the pre-coding indicators can be preset as needed. In an implementation, the correspondence relationships can be specified in a protocol or can be signaled in high-layer signaling.

In a second approach, the network side device determines the pre-coding matrix corresponding to the received first pre-coding indicator, second pre-coding indicator and third pre-coding indicator according to a preset correspondence relationship between the first pre-coding indicator, the second pre-coding indicator and the third pre-coding indicator, and the pre-coding matrix.

Where the correspondence relationship between the first pre-coding indicator, the second pre-coding indicator and the third pre-coding indicator, and the pre-coding matrix can be preset as needed. In an implementation, the correspondence relationship can be specified in a protocol or can be signaled in high-layer signaling.

The network side device preprocesses data transmitted by the user equipment using the determined pre-coding matrix after determining the pre-coding matrix.

Where horizontal and vertical dimensions can be interchangeable in the embodiment of the invention.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting a coding indicator, the method comprising:

determining, by a user equipment, a first pre-coding indicator, a second pre-coding indicator and a third pre-coding indicator, wherein the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer; and transmitting, by the user equipment, the first pre-coding indicator, the second pre-coding indicator and the third pre-coding indicator to the network side;

wherein the third component pre-coding matrix is a product of a $(2M_H M_V) \times r$-dimension matrix with a power normalization coefficient, wherein r represents the number of columns in the pre-coding matrix; and the third component pre-coding matrix is:

$$W_3 = \begin{bmatrix} e_{k_1} & e_{k_2} & \cdots & e_{k_r} \\ \alpha_1 e_{k_1} & \alpha_2 e_{k_2} & \cdots & \alpha_r e_{k_r} \end{bmatrix} M,$$

wherein $W_3$ represents the third component pre-coding matrix; $e_{k_j}$ represents a column vector with a length of $M_H M_V$ with the $k_j$-th element being 1 and all the other elements being 0; and $\alpha_j$ represents a complex scalar with a modulus being 1, wherein $M_H$ and $M_V$ represent positive integers, and M represent the power normalization coefficient.

2. The method according to claim 1, wherein determining, by the user equipment, the first pre-coding indicator, the second pre-coding indicator and the third pre-coding indicator comprises:

selecting, by the user equipment, the first component pre-coding matrix from a set of first component pre-coding matrices and determining the first pre-coding indicator corresponding to the selected first component pre-coding matrix, selecting the second component pre-coding matrix from a set of second component pre-coding matrices and determining the second pre-coding indicator corresponding to the selected second component pre-coding matrix, and selecting the third component pre-coding matrix from a set of third component pre-coding matrices and determining the third pre-coding indicator corresponding to the selected third component pre-coding matrix; or determining, by the user equipment, at least one pre-coding matrix; and determining first pre-coding indicators, second pre-coding indicators and third pre-coding indicators corresponding to the at least one pre-coding matrix according to a correspondence relationship between the first pre-coding indicators, the second pre-coding indicators and the third pre-coding indicators, and the pre-coding matrix; and determining, by the user equipment, one of the determined first pre-coding indicators, one of the determined second pre-coding indicators and one of the determined third pre-coding indicators as the first pre-coding indicator, the second pre-coding indicator and the third pre-coding indicator to be signaled to the network side.

3. The method according to claim 1, wherein the first component pre-coding matrix is:

$$W_1 = \begin{bmatrix} Z & 0 \\ 0 & Z \end{bmatrix}; \text{ or } W_1 = \begin{bmatrix} Z & 0 \\ 0 & ZB \end{bmatrix};$$

wherein $W_1$ represents the first component pre-coding matrix; Z represents a vertical $D_V \times M_V$-dimension beam-forming matrix; and B represents a $M_V \times M_V$-dimension diagonal matrix, wherein $D_V$ and $M_V$ represent positive integers.

4. The method according to claim 1, wherein the second component pre-coding matrix is X or XA;

wherein X represents a horizontal $D_H \times M_H$-dimension beam-forming matrix; and A represents a $M_H \times M_H$-dimension diagonal matrix, wherein $M_H$ and $D_H$ represent positive integers.

5. The method according to claim 1, wherein the pre-coding matrix is:

$$W = (W_1 \otimes W_2) \cdot W_3$$

wherein W represents the pre-coding matrix, W1 represents the first component pre-coding matrix, W2 represents the second component pre-coding matrix, and W3 represents the third component pre-coding matrix.

6. A method for determining a pre-coding matrix, the method comprising:

receiving, by a network side device, a first pre-coding indicator, a second pre-coding indicator and a third pre-coding indicator from a user equipment; and determining, by the network side device, a pre-coding matrix from the first pre-coding indicator, the second pre-coding indicator and the third pre-coding indicator, wherein the pre-coding matrix is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer wherein the third component pre-coding matrix is a product of a $(2M_H M_V) \times r$-dimension matrix with a power normalization coefficient, wherein r represents the number of columns in the pre-coding matrix; and the third component pre-coding matrix is:

$$W_3 = \begin{bmatrix} e_{k_1} & e_{k_2} & \ldots & e_{k_r} \\ \alpha_1 e_{k_1} & \alpha_2 e_{k_2} & \ldots & \alpha_r e_{k_r} \end{bmatrix} M,$$

wherein $W_3$ represents the third component pre-coding matrix; $e_{k_i}$ represents a column vector with a length of $M_H M_V$ with the $k_i$-th element being 1 and all the other elements being 0; and $\alpha_i$ represents a complex scalar with a modulus being 1, wherein $M_H$ and $M_V$ represent positive integers, and M represent the power normalization coefficient.

7. The method according to claim 6, wherein determining, by the network side device, the pre-coding matrix comprises:

determining, by the network side device, the first component pre-coding matrix corresponding to the first pre-coding indicator, determining the second component pre-coding matrix corresponding to the second pre-coding indicator, and determining the third component pre-coding matrix corresponding to the third pre-coding indicator; or determining, by the network side device, the pre-coding matrix corresponding to the received first pre-coding indicator, second pre-coding indicator and third pre-coding indicator according to a preset correspondence relationship between the first pre-coding indicator, the second pre-coding indicator and the third pre-coding indicator, and the pre-coding matrix;

and the network side device determines the pre-coding matrix in the equation of:

$$W = (W_1 \otimes W_2) \cdot W_3$$

wherein W represents the pre-coding matrix, W1 represents the first component pre-coding matrix, W2 represents the second component pre-coding matrix, and W3 represents the third component pre-coding matrix.

8. The method according to claim 6, wherein the first component pre-coding matrix is:

$$W_1 = \begin{bmatrix} Z & 0 \\ 0 & Z \end{bmatrix}; \text{ or } W_1 = \begin{bmatrix} Z & 0 \\ 0 & ZB \end{bmatrix};$$

wherein $W_1$ represents the first component pre-coding matrix; Z represents a vertical $D_V \times M_V$-dimension beam-forming matrix; and B represents a $M_V \times M_V$-dimension diagonal matrix, wherein $D_V$ and $M_V$ represent positive integers; and Z represents an element in a set of vertical beam-forming matrices $\{Z_q: q=0,1,\ldots,N_V-1\}$ with $Z=Z_n$ and $0 \leq n \leq N_V-1$, wherein $N_V$ represents a positive integer.

9. The method according to claim 6, wherein the second component pre-coding matrix is X or XA;

wherein X represents a horizontal $D_H \times M_H$-dimension beam-forming matrix; and A represents a $M_H \times M_H$-dimension diagonal matrix, wherein $M_H$ and $D_H$ represent positive integers; and X represents an element in a set of horizontal beam-forming matrices $\{X_p: p=0,1,\ldots,N_H-1\}$ with $X=X_k$ and $0 \le k \le N_H-1$, wherein $N_H$ represents a positive integer.

10. A user equipment, for transmitting a coding indicator, the user equipment comprising:
   circuitry configured to implement a first determining module and a transmitting module,
   the first determining module used to determine a first pre-coding indicator, a second pre-coding indicator and a third pre-coding indicator, wherein the first pre-coding indicator, the second pre-coding indicator and the third pre-coding indicator correspond to a pre-coding matrix which is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer; and
   the transmitting module used to transmit the first pre-coding indicator, the second pre-coding indicator and the third pre-coding indicator to the network side;
   wherein the third component pre-coding matrix is a product of a $(2M_H M_V) \times r$-dimension matrix with a power normalization coefficient, wherein r represents the number of columns in the pre-coding matrix; and
   the third component pre-coding matrix is:

$$W_3 = \begin{bmatrix} e_{k_1} & e_{k_2} & \ldots & e_{k_r} \\ \alpha_1 e_{k_1} & \alpha_2 e_{k_2} & \ldots & \alpha_r e_{k_r} \end{bmatrix} M,$$

wherein $W_3$ represents the third component pre-coding matrix; $e_{k_j}$ represents a column vector with a length of $M_H M_V$ with the $k_i$-th element being 1 and all the other elements being 0; and $\alpha_i$ represents a complex scalar with a modulus being 1, wherein $M_H$ and $M_V$ represent positive integers, and M represent the power normalization coefficient.

11. The user equipment according to claim 10, wherein the first determining module is used:
   to select the first component pre-coding matrix from a set of first component pre-coding matrices and to determine the first pre-coding indicator corresponding to the selected first component pre-coding matrix, to select the second component pre-coding matrix from a set of second component pre-coding matrices and to determine the second pre-coding indicator corresponding to the selected second component pre-coding matrix, and to select the third component pre-coding matrix from a set of third component pre-coding matrices and to determine the third pre-coding indicator corresponding to the selected third component pre-coding matrix; or
   to determine at least one pre-coding matrix; to determine first pre-coding indicators, second pre-coding indicators and third pre-coding indicators corresponding to the at least one pre-coding matrix according to a correspondence relationship between the first pre-coding indicators, the second pre-coding indicators and the third pre-coding indicators, and the pre-coding matrix; and to determine one of the determined first pre-coding indicators, one of the determined second pre-coding indicators and one of the determined third pre-coding indicators as the first pre-coding indicator, the second pre-coding indicator and the third pre-coding indicator to be signaled to the network side.

12. The user equipment according to claim 10, wherein the first component pre-coding matrix is:

$$W_3 = \begin{bmatrix} e_{k_1} & e_{k_2} & \ldots & e_{k_r} \\ \alpha_1 e_{k_1} & \alpha_2 e_{k_2} & \ldots & \alpha_r e_{k_r} \end{bmatrix} M,$$

wherein $W_1$ represents the first component pre-coding matrix; Z represents a vertical $D_V \times M_V$-dimension beam-forming matrix; and B represents a $M_V \times M_V$-dimension diagonal matrix, wherein $D_V$ and $M_V$ represent positive integers.

13. The user equipment according to claim 10, wherein the second component pre-coding matrix is X or XA;
   wherein X represents a horizontal $D_H \times M_H$-dimension beam-forming matrix; and A represents a $M_H \times M_H$-dimension diagonal matrix, wherein $M_H$ and $D_H$ represent positive integers.

14. The user equipment according to claim 10, wherein the pre-coding matrix is:

$$W=(W_1 \otimes W_2) \cdot W_3,$$

wherein W represents the pre-coding matrix, W1 represents the first component pre-coding matrix, W2 represents the second component pre-coding matrix, and W3 represents the third component pre-coding matrix.

15. A network side device for determining a pre-coding matrix, the network side device comprising:
   circuitry configured to implement a receiving module and a second determining module,
   the receiving module used to receive a first pre-coding indicator, a second pre-coding indicator and a third pre-coding indicator from a user equipment; and
   the second determining module used to determine a pre-coding matrix from the first pre-coding indicator, the second pre-coding indicator and the third pre-coding indicator,
   wherein the pre-coding matrix is equal to a matrix as a function of a first component pre-coding matrix, a second component pre-coding matrix and a third component pre-coding matrix, the first component pre-coding matrix is a block diagonal matrix, and the third component pre-coding matrix is composed of weighted column selection vectors, and in each of the weighted column selection vectors only P elements are non-zero with P being a positive integer;
   wherein the third component pre-coding matrix is a product of a $(2M_H M_V) \times r$-dimension matrix with a power normalization coefficient, wherein r represents the number of columns in the pre-coding matrix; and
   the third component pre-coding matrix is:

$$W_3 = \begin{bmatrix} e_{k_1} & e_{k_2} & \ldots & e_{k_r} \\ \alpha_1 e_{k_1} & \alpha_2 e_{k_2} & \ldots & \alpha_r e_{k_r} \end{bmatrix} M,$$

wherein $W_3$ represents the third component pre-coding matrix; $e_{k_j}$ represents a column vector with a length of $M_H M_V$ with the $k_i$-th element being 1 and all the other elements being 0; and $\alpha_i$ represents a complex scalar with a modulus being 1, wherein $M_H$ and $M_V$ represent positive integers, and M represent the power normalization coefficient.

16. The network side device according to claim 15, wherein the second determining module is used:

to determine the first component pre-coding matrix corresponding to the first pre-coding indicator, to determine the second component pre-coding matrix corresponding to the second pre-coding indicator, and to determine the third component pre-coding matrix corresponding to the third pre-coding indicator; or to determine the pre-coding matrix corresponding to the received first pre-coding indicator, second pre-coding indicator and third pre-coding indicator according to a preset correspondence relationship between the first pre-coding indicator, the second pre-coding indicator and the third pre-coding indicator, and the pre-coding matrix;

and to determine the pre-coding matrix in the equation of:

$$W = (W_1 \otimes W_2) \cdot W_3,$$

wherein W represents the pre-coding matrix, W1 represents the first component pre-coding matrix, W2 represents the second component pre-coding matrix, and W3 represents the third component pre-coding matrix.

17. The network side device according to claim 15, wherein the first component pre-coding matrix is:

$$W_1 = \begin{bmatrix} Z & 0 \\ 0 & Z \end{bmatrix}; \text{ or } W_1 = \begin{bmatrix} Z & 0 \\ 0 & ZB \end{bmatrix};$$

wherein $W_1$ represents the first component pre-coding matrix; Z represents a vertical $D_V \times M_V$-dimension beam-forming matrix; and B represents a $M_V \times M_V$-dimension diagonal matrix, wherein $D_V$ and $M_V$ represent positive integers; and Z represents an element in a set of vertical beam-forming matrices $\{Z_q: q=0,1,\ldots,N_V-1\}$ with $Z=Z_n$ and $0 \leq n \leq N_V-1$, wherein $N_V$ represents a positive integer.

18. The network side device according to claim 15, wherein the second component pre-coding matrix is X or XA;

wherein X represents a horizontal $D_H \times M_H$-dimension beam-forming matrix; and A represents a $M_H \times M_H$-dimension diagonal matrix, wherein $M_H$ and $D_H$ represent positive integers; and X represents an element in a set of horizontal beam-forming matrices $\{X_p: p=0,1,\ldots,N_H-1\}$ with $X=X_k$ and $0 \leq k \leq N_H-1$, wherein $N_H$ represents a positive integer.

* * * * *